US010295662B2

United States Patent
Noonan

(10) Patent No.: US 10,295,662 B2
(45) Date of Patent: May 21, 2019

(54) PRODUCING DATA DESCRIBING TARGET MEASUREMENTS

(71) Applicant: BAE Systems plc, London (GB)

(72) Inventor: Colin Anthony Noonan, Warton (GB)

(73) Assignee: BAE Systems plc, London (GB)

( * ) Notice: Subject to any disclaimer, the term of this patent is extended or adjusted under 35 U.S.C. 154(b) by 373 days.

(21) Appl. No.: 15/120,624

(22) PCT Filed: Mar. 13, 2015

(86) PCT No.: PCT/GB2015/050735
§ 371 (c)(1),
(2) Date: Aug. 22, 2016

(87) PCT Pub. No.: WO2015/140517
PCT Pub. Date: Sep. 24, 2015

(65) Prior Publication Data
US 2017/0010348 A1 Jan. 12, 2017

(30) Foreign Application Priority Data

Mar. 17, 2014 (EP) ..................... 14275075
Mar. 17, 2014 (GB) ..................... 1404753.4

(51) Int. Cl.
G01S 7/00 (2006.01)
G01S 13/72 (2006.01)
(Continued)

(52) U.S. Cl.
CPC .............. *G01S 13/86* (2013.01); *G01S 7/003* (2013.01); *G01S 7/2955* (2013.01);
(Continued)

(58) Field of Classification Search
CPC ........ G01S 13/86; G01S 7/003; G01S 13/723; G01S 13/726; G01S 13/87; G01S 17/66; G01S 17/87
See application file for complete search history.

(56) References Cited

U.S. PATENT DOCUMENTS 3,981,010 A * 9/1976 Michelsen ............ F41G 3/2611
342/55
5,005,147 A * 4/1991 Krishen ............... G06K 9/6293
703/13

(Continued)

FOREIGN PATENT DOCUMENTS

DE 19701387 C2 7/1998
EP 2343672 A1 7/2011
(Continued)

OTHER PUBLICATIONS

International Preliminary Report on Patentability and the Written Opinion of the International Searching Authority dated Sep. 20, 2016, for International Application No. PCT/GB2015/050735, 9 pages.

(Continued)

*Primary Examiner* — Peter M Bythrow
(74) *Attorney, Agent, or Firm* — Maine Cernota & Rardin

(57) ABSTRACT

Methods and systems for producing data describing target measurements using a processor (102) in a system (100) having at least one on-board sensor (106) on a vehicle. The method includes obtaining data from an on-board sensor (106), obtaining data from a sensor (108) off-board the vehicle, approximating (312) a target alignment error between the on-board and off-board sensor data, receiving target alignment error data in respect of at least one other sensor set comprising at least two sensors, estimating (316) a bias using the received target alignment error data and correcting the approximated target alignment error using the
(Continued)

bias, and performing (320) a data fusion process on the obtained off-board sensor data and the obtained on-board sensor data using the approximated target alignment error to produce target measurement data.

13 Claims, 2 Drawing Sheets

(51) Int. Cl.
| | |
|---|---|
| *G01S 13/86* | (2006.01) |
| *G01S 13/87* | (2006.01) |
| *G01S 17/66* | (2006.01) |
| *G01S 17/87* | (2006.01) |
| *G01S 7/295* | (2006.01) |

(52) U.S. Cl.
CPC .......... *G01S 13/723* (2013.01); *G01S 13/726* (2013.01); *G01S 13/87* (2013.01); *G01S 17/66* (2013.01); *G01S 17/87* (2013.01)

(56) References Cited

U.S. PATENT DOCUMENTS

| | | | | |
|---|---|---|---|---|
| 5,798,942 | A * | 8/1998 | Danchick | G01S 3/7864 |
| | | | | 342/36 |
| 6,122,572 | A * | 9/2000 | Yavnai | G05D 1/0088 |
| | | | | 342/13 |
| 6,459,990 | B1 | 10/2002 | McCall et al. | |
| 6,529,820 | B2 * | 3/2003 | Tomescu | G01S 5/0063 |
| | | | | 342/36 |
| 7,421,090 | B2 | 9/2008 | Muise et al. | |
| 7,437,225 | B1 * | 10/2008 | Rathinam | G08G 5/0013 |
| | | | | 340/961 |
| 7,477,994 | B2 | 1/2009 | Sunshine et al. | |
| 7,626,534 | B1 * | 12/2009 | Boka | G01S 13/726 |
| | | | | 342/106 |
| 8,089,393 | B2 * | 1/2012 | Nettleton | G01S 7/003 |
| | | | | 342/175 |
| 8,306,747 | B1 | 11/2012 | Gagarin et al. | |
| 8,594,927 | B2 | 11/2013 | Louis et al. | |
| 2003/0204382 | A1 * | 10/2003 | Julier | G06F 17/18 |
| | | | | 702/196 |
| 2004/0047492 | A1 | 3/2004 | Muise et al. | |
| 2005/0052315 | A1 | 3/2005 | Winterling et al. | |
| 2007/0021879 | A1 | 1/2007 | DelNero et al. | |
| 2007/0036439 | A1 | 2/2007 | Chen | |
| 2008/0189003 | A1 | 8/2008 | Gillula | |
| 2009/0231183 | A1 | 9/2009 | Nettleton et al. | |
| 2010/0315281 | A1 * | 12/2010 | Askelson | G01S 7/003 |
| | | | | 342/30 |
| 2011/0035149 | A1 * | 2/2011 | McAndrew | G05D 1/0038 |
| | | | | 701/466 |
| 2011/0169951 | A1 | 7/2011 | Claxton et al. | |
| 2012/0030154 | A1 * | 2/2012 | Nicholson | G01S 7/003 |
| | | | | 706/12 |
| 2012/0277948 | A1 * | 11/2012 | Noonan | G01S 7/003 |
| | | | | 701/23 |
| 2013/0166202 | A1 | 6/2013 | Bandyopadhyay et al. | |
| 2014/0316616 | A1 * | 10/2014 | Kugelmass | G05D 1/101 |
| | | | | 701/8 |
| 2015/0277440 | A1 * | 10/2015 | Kimchi | G01S 17/08 |
| | | | | 701/26 |
| 2016/0259032 | A1 * | 9/2016 | Hehn | G01S 5/0289 |
| 2016/0275801 | A1 * | 9/2016 | Kopardekar | G08G 5/0043 |

FOREIGN PATENT DOCUMENTS

| | | |
|---|---|---|
| WO | 2003001474 A2 | 1/2003 |
| WO | 2007144570 A1 | 12/2007 |
| WO | 2010026417 A1 | 3/2010 |
| WO | 2011073683 A1 | 6/2011 |

OTHER PUBLICATIONS

International Search Report for International Application No. PCT/GB2010/052139, dated Mar. 15, 2011, 5 pages.

European Search Report dated Jun. 14, 2010, for European Application No. 09252822.3.

Great Britain Search Report dated May 5, 2010, for Great Britain Application No. 0922011.2.

Jeffrey K. Uhlmann, Covariance consistency methods for fault-tolerant distributed date fusion, Information Fusion, vol. 4, No. 4, Sep. 1, 2003, pp. 201-215.

T.J. Wren et al., Multi-Platform Multi-Target Tracking Fusion Via Covariance Intersection: Using Fuzzy Optimised Modified Kalman Filters With Measurement Noise Covariance Estimation, Apr. 15, 2008, pp. 187-194.

Matthew Ridley et ai, Decentralised Ground Target Tracking with Heterogeneous Sensing Nodes on Multiple UAVs, Lecture notes in Computer Science, Springer DE, vol. 2634, Jan. 1, 2003, pp. 545-565.

Martin E Liggins II, et al., Distributed Fustion Architectures and Algorithms for Target Tracking, Proceedings of the IEEE, vol. 85, No. 1, Jan. 1997, pp. 95-107.

Samuel S. Blackman, Multiple-Target Tracking with Radar Application, Jan. 1, 1986, Artech house, Dedham, MA USA, pp. 19-47 (chapter 2) and pp. 357-396 (chapter 13).

Duncan Smith et al., Approaches to Multisensor Data Fusion in Target Tracking: A Survey, IEEE Transactions on Knowledge and Data Engineering, IEEE Service Center, Los Alamitos, CA USA, vol. 18, No. 12, Dec. 1, 2006, pp. 1696-1710.

International Preliminary Report on Patentability and the Written Opinion of the International Searching Authority dated Jun. 28, 2012, for International Application No. PCT/GB2010/052139, 8 pages.

European Search Report for EP Application No. EP 14275075, dated Sep. 15, 2014, 8 pages.

Great Britain Search Report for GB Application No. GB 1404753A, dated Sep. 30, 2014, 3 pages.

Great Britain Combined Search and Examination Report for GB Application No. GB 1504240.1, dated Sep. 21, 2015, 6 pages.

PCT Search Report for PCT Application No. PCT/GB2015/050735, dated Jul. 16, 2015, 11 pages.

\* cited by examiner

PRODUCING DATA DESCRIBING TARGET MEASUREMENTS

RELATED APPLICATIONS

This application is a national phase application filed under 35 U.S.C. § 371 of PCT Application No. PCT/GB2015/050735 with an International filing date of Mar. 13, 2015 which claims priority of GB Patent Application 1404753.4 filed Mar. 17, 2014 and EP Patent Application 14275075.1 also filed Mar. 17, 2014. Each of these applications is herein incorporated by reference in its entirety for all purposes.

FIELD OF THE INVENTION

The present invention relates to producing data describing target measurements, using a system having at least one on-board sensor, the system being in communication with at least one off-board co-operator also having at least one sensor.

BACKGROUND OF THE INVENTION

Modern autonomous systems, such as autonomous vehicles, tend to be fitted with more and better sensors than in the past. Improved communications technology also means that more and better information can be relayed within the autonomous system and/or exchanged with a remote operator for the purpose of identifying or tracking targets.

Conventional systems for producing data describing target measurements depend on the ability of individual sensor platforms to cooperate together in groups and build an accurate local operational picture. The local pictures may then be fused in a higher level process to give a common operational picture from which information can be obtained.

However, attempts to connect groups of sensors and fuse their data have often encountered a common problem: that of poor alignment. The sensor platforms are subject to uncertainties regarding their location and orientation, both of the platform itself and of the sensors with respect to the platform; and their clocks are not in perfect synchronisation. These uncertainties lead to additional errors that, unless handled explicitly, can degrade the quality of the output from a conventional data fusion approach.

Solutions to the problem of alignment error have been proposed that extend the processes carried out in the data fusion centre, but they are subject to problems of practicality in present day and next generation systems as they are often more complex than conventional processes and, therefore, require prohibitively large amounts of processing. Furthermore, previously-proposed solutions require extra information to be communicated using on-board buses and off-board communications systems which currently have neither the capacity nor the message sets to provide such information. The quality of the solution can depend on the arrangement of targets within the field of interest, which is not usually controllable. Other known solutions require fixed targets or beacons, which are only available in certain environments and, once fixed, the platform to co-operator alignment error would gradually return over time when the sensor platform leaves the vicinity of the fixed targets or beacons.

Embodiments of the present invention are intended to address at least some of the problems outlined above.

SUMMARY OF THE INVENTION

According to a first aspect of the present invention, there is provided a method of producing on a vehicle data describing target measurements of one or more target positions using a processor in a system having at least one sensor on-board the vehicle, the method including: obtaining first on-board sensor data representative of a target from said on-board sensor; obtaining from a sensor of an off-board vehicle co-operator first off-board sensor data representative of said target; approximating a target alignment error between said first on-board sensor data representative of said target and said first off-board sensor data representative of said target; subsequently obtaining second on-board sensor data representative of said target from said on-board sensor and obtaining second off-board sensor data representative of said target from said off-board sensor; receiving alignment error data derived from said second on-board and off-board sensor data; estimating a bias using said received target alignment error data and correcting said approximated target alignment error using said bias; and performing a data fusion process on the obtained first off-board sensor data and the obtained first on-board sensor data using said corrected approximated target alignment error to produce a measure of said target position.

As will be appreciated by a person skilled in the art, on-board and off-board tracks are created and maintained (solely) within each sensor platform's frame-of-reference. Thus, the method preferably includes associating track data obtained by said on-board sensor with corresponding track data from said off-board sensor to create an on-board/off-board track pair, and approximating said alignment error for said on-board/off-board track pair; and a preferred embodiment, includes creating a plurality of on-board/off-board track pairs in relation to a plurality of respective pairs of on-board and off-board sensors within the environment in which said system is operating, and approximating a target alignment error in respect of each of said on-board/off-board track pairs. So, when the on-board/off-board tracks are compared, information about the relative alignment of the frames can be derived.

The target alignment error is preferably approximated as an independent Cartesian bias in location between said on-board and off-board track data. The independent Cartesian approximation of the alignment error can be estimated in all circumstances given only the on-board and off-board sensor data for a single target, as defined above. This is not true of other data representations and gives the present invention a significant advantage over known approaches.

In a preferred embodiment, the method includes constructing an assignment matrix comprised of on-board/off-board track data associations, said assignment matrix being constructed using modelled target alignment errors in respect of said on-board/off-board track pairs.

In this case, the method preferably includes selecting an optimal set of data associations from said assignment matrix, beneficially using a Munkres algorithm.

A preferred embodiment of the invention includes updating said estimated bias each time new off-board track data is associated with fused on-board track data; beneficially such updating of the estimated bias is performed using a moving average algorithm.

The target measurement data preferably includes descriptions of location and/or velocity of the targets.

Thus, the principle of a preferred embodiment of the present invention is that as a sequence of observations of the target by an on-board/off-board sensor pair is built up, and a sequence of alignment errors is calculated, the alignment errors are combined in a moving average estimator to give an overall alignment estimator, which becomes increasingly refined and accurate with each new observation pair.

The present invention extends to a computer program configured to execute a method described above.

According to a second aspect of the invention, there is provided a system having a processor and at least one sensor on-board a vehicle, the system being configured to produce data describing measurements of one or more targets and including: a device configured to obtain first on-board sensor data from an on-board sensor; a device configured to obtain first off-board sensor data from a sensor of an off-board vehicle co-operator; a device configured to approximate a target alignment error between said first on-board and off-board sensor data; a device configured to subsequently obtain second on-board sensor data representative of said target from said on-board sensor; a device configured to obtain second off-board sensor data representative of said target from said off-board sensor; a device configured to receive target alignment error data derived from said second on-board and off-board sensor data; a device configured to estimate a bias using said received target alignment error data and to correct said target alignment error using said bias; and a device configured to perform a data fusion process on the obtained first off-board sensor data and the obtained first on-board sensor data using said approximated target alignment error to produce target measurement data.

Such a system may comprise an at least partially autonomous vehicle.

Furthermore, such a system may be carried on an aircraft.

The present invention offers a practical system which reduces alignment error in present day and next-generation systems with relatively simple augmentations to the data fusion process and using only the sensor and data link track reports and (for the latter source) co-operator self reports, all of which information is available, or at least obtainable, using existing hardware.

The present invention is suitable for use in a variety of different systems and environments, including:
- Alignment error reduction for co-operative processing of off-board data regarding point targets with full 3-D information with respect to the processing vehicle's local frame of reference.
- Present day sensing suites, including Navigation sensing by, for example, inertial navigation systems or global positioning systems.
- Military data communications and synchronisation.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways and, by way of example only, embodiments thereof will now be described, reference being made to the accompanying drawings in which.

DETAILED DESCRIPTION

Figure 1:
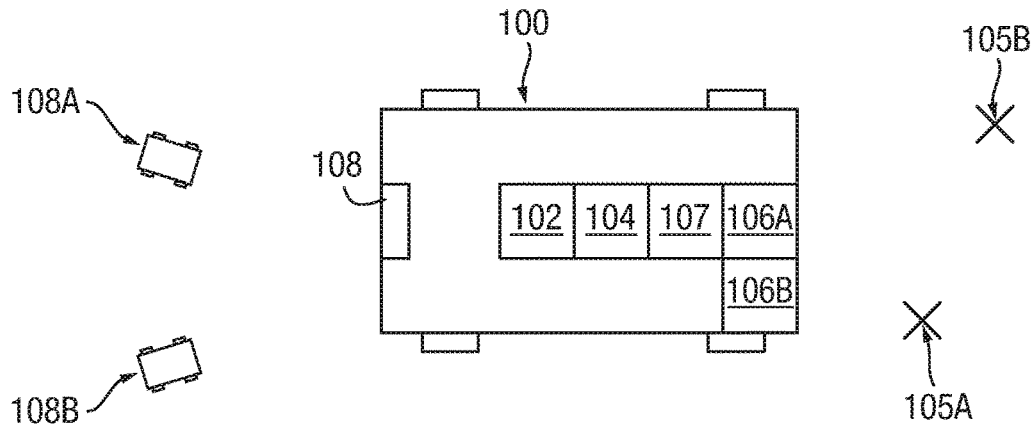
FIG. 1 is a schematic diagram of a vehicle with on-board sensors and a processor, as well as external targets.

The significant components of target alignment error are orientation and location uncertainty, and poor time synchronisation between co-operating platforms. Each source of uncertainty gives rise to different errors. Orientation error makes the apparent locations of targets rotate around the sensor point of view. The magnitude of the error depends on both the magnitude of the misalignment and the distance from which the target was observed; and the direction in which the error is experienced depends on the location of the target relative to the observer. For targets observed at long range, this can be the dominant source of error.

Targets that are relatively close together will experience orientation errors of similar magnitude and direction, whilst targets that have no near neighbours will experience errors unique to themselves. The errors may be compounded by poor correlation and association decisions.

Each platform's uncertainty regarding its own location results in a corresponding error in each track report that it makes. The error is unaffected by the observation distance or the relative positions of the target and observer. For targets observed at relatively short range with high precision sensors, observer location uncertainty can introduce significant errors.

When time synchronisation is poor, the effect on track reports is to advance or retard them along the trajectory of the track. So, the errors depend on the target velocity vectors as well as the size of the synchronisation error.

When a TDMA communications system is used, synchronisation is necessarily good (because the TDMA organisation and transmission slots are defined in terms of time) and the magnitude of these errors is small in relation to the other sources, even for hypersonic targets. For other data links, synchronisation need not be so good. TDMA has been chosen as the data link model for the following exemplary embodiment of the invention because it is the most common data link organisation for aircraft sharing the tactical picture.

When the two types of errors described above are combined, the total error picture for two observers reporting on, for example, three targets is confusing. Each target would be reported by the two observers in different positions due to the different target alignment and location errors experienced by the observers. In addition to this, the tracking uncertainties would cause these positions to fluctuate from report to report. To be effective, the data fusion system must remove the confusion.

The assumed dominant components of the target alignment error contribution from a single target update are summarised:

| Component | Properties | Time Variability | Target to Target Variability |
|---|---|---|---|
| INS Orientation | Predominantly error in perceived heading (yaw) giving a rotation in the horizontal plane. | The heading error oscillates slowly. Other errors are noisy and smaller. | Same rotation in azimuth about the observer point of view for all targets observed by a given platform. |
| Sensor orientation | This is manifested as a rotation with three degrees of freedom (yaw, pitch and roll). | Fixed for a given sensor and platform. | The mapping to spatial bias varies with target location within the sensor coverage. |
| GPS location | A shift in perceived observer location with three degrees of freedom (latitude, longitude and altitude). | Changes in steps when changes in GPS satellite constellation occur. | Between steps, the same for all targets observed by a given platform. |
| Synchronisation | Target location advanced or retarded along its trajectory. | Fixed. | Varies with target velocity. |

"Noisy" errors can be ignored because the conventional data fusion process reduces these provided due allowance is made for their presence in the error covariance matrix; leaving seven components that change sufficiently slowly over time and space to be appear as an approximate constant (actually, slowly changing) bias in the reported target location.

When this report is fused with on-board sensor data, the on-board data has its own target alignment errors. Thus, any estimators based on a full mathematical expression for the target alignment error bias in a single data fusion update would involve equations in 14 variables and this is not likely to lead to a practical algorithm. The present invention addresses this issue, amongst others, to provide an improved system which estimates and reduces target alignment errors experienced by, for example, aircraft receiving target information from off-board sensors and fusing that information with on-board sensor data.

FIG. 1 shows a vehicle 100 that is fitted with a computing device including a processor 102 and memory 104. The vehicle will also include other conventional features, e.g. steering, propulsion and/or traction components, and may be at least partially automated and/or can include a planning system for assisting a human operator. The vehicle may be capable of travelling on/through land, air or water. The vehicle will also typically include communications devices for communicating with external systems, including other vehicles. It will be appreciated that the vehicle is only one example of a system having at least one on-board sensor that can be used to produce data describing target measurements and in alternative embodiments the system can comprise other types of devices, such as a hand-held tracking unit, for example.

The vehicle 100 is further fitted with at least one local on-board sensor. In the example the vehicle has a first local sensor 106A and a second local sensor 106B. The local sensors are configured to take measurements relative to the vehicle, typically to obtain information regarding obstacles/objects (which may be static or moving) in the vicinity of the vehicle. Such obstacles/objects shall be called "targets" herein and examples are shown schematically at 105A and 105B, but it will be understood that a target is not necessarily something at which a weapon is to be fired. Examples of suitable local sensors include visual, infra-red, RADAR or LIDAR type devices and the sensors can produce information regarding the range and/or angle to an object in the environment, but other types of output can be produced, e.g. estimated velocity of a moving object.

The processor 102 executes code that is intended to use data received directly or indirectly from at least one of the on-board sensors and combine it with data received indirectly from at least one off-board sensor (see below) in order to produce data describing the measurements of at least one sensed target. Examples of on-board sensor data used by the processor are given below, but it will be understood that the type of data can vary:

Sensor number/identifier
List update time
Number of tracks
Tracks

The track data type can include the following data, for example: Track number/identifier; Track update time; Track update class (e.g. no update, delete, 3_D track, line of sight, IFF response); Multiple target (Boolean); Manoeuvre parameter (magnitude of manoeuvre); Location; Velocity; Covariance (full location and velocity covariance matrix), and/or Environment (unknown, space, air, sea, subsurface).

The vehicle 100 further includes a communications interface 107 that is configured to communicate with remote devices. The remote devices take the form of two other vehicles 108A,108B in the example, but it will be understood that the number and nature of the devices can vary. The data exchanged between the vehicle 100 and the remote devices 108 will normally include sensor-related data. Thus, the vehicle 100 can receive off-board sensor readings. If the off-board readings are not in the same format as those taken by its own sensors then the readings may be converted into a suitable format. Examples of off-board sensor data used by the processor are given below, but it will be understood that the type of data can vary:

List update time
Number of reports
Track reports

The track report data type can include, for example: Extrapolation time; Update time; Report status (none, new track, delete track); Report class (unknown, co-operator self report, 3-D track, line of sight); Co-operator (e.g. remote device/vehicle identity) number; Track number; Update time valid (Boolean); Velocity valid (Boolean); Quality indicator valid (Boolean); Location; Velocity; Location quality indicator and/or Environment (unknown, space, air, land, sea, subsurface).

Figure 2:
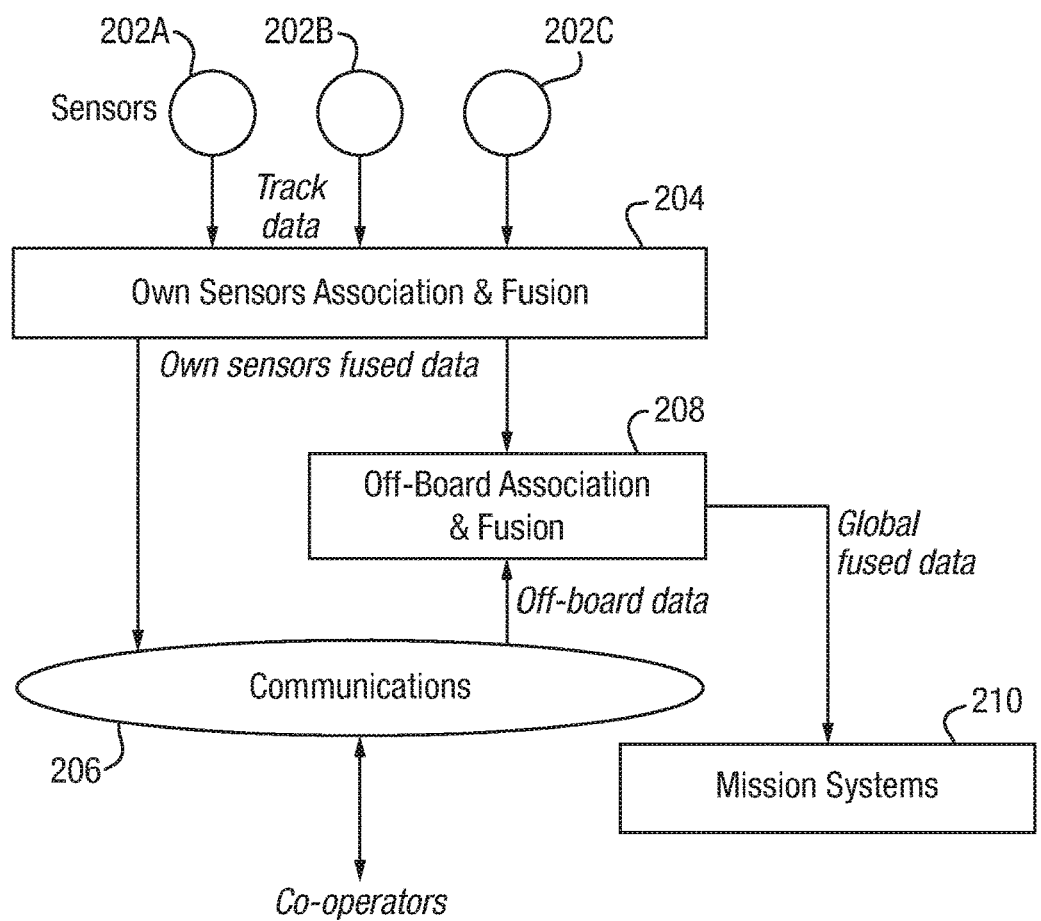
FIG. 2 is a schematic illustration of an architecture for another example system configured to produce data describing measurements of a plurality of targets.

FIG. 2 illustrates schematically the architecture of another example system having a set of on-board sensors 202A-202C that transfer track data to data association and data fusion processes 204 that execute on an on-board processor. The system further includes a communications interface 206 that receives track data from at least one off-board sensor. The on-board data processes 204 generate fused data which may be transferred to the communications interface 206 for use by off-board processors on at least one remote device.

The fused data generated by the on-board data processes 204 can also be transferred to at least one on-board mission system 210 that can be used to control the vehicle, for example, based on the target measurement information that has been generated. For instance, the vehicle may be controlled in order to avoid the targets. Own measurement data from the vehicle's navigation system may also be taken into account during the data processing. Such data can include, for example: Time; Location; Velocity; Acceleration; Attitude; Attitude rates of change; Heading; Magnetic heading; Expected plan position error; Expected vertical position error; Groundspeed, and/or Track.

Figure 3:
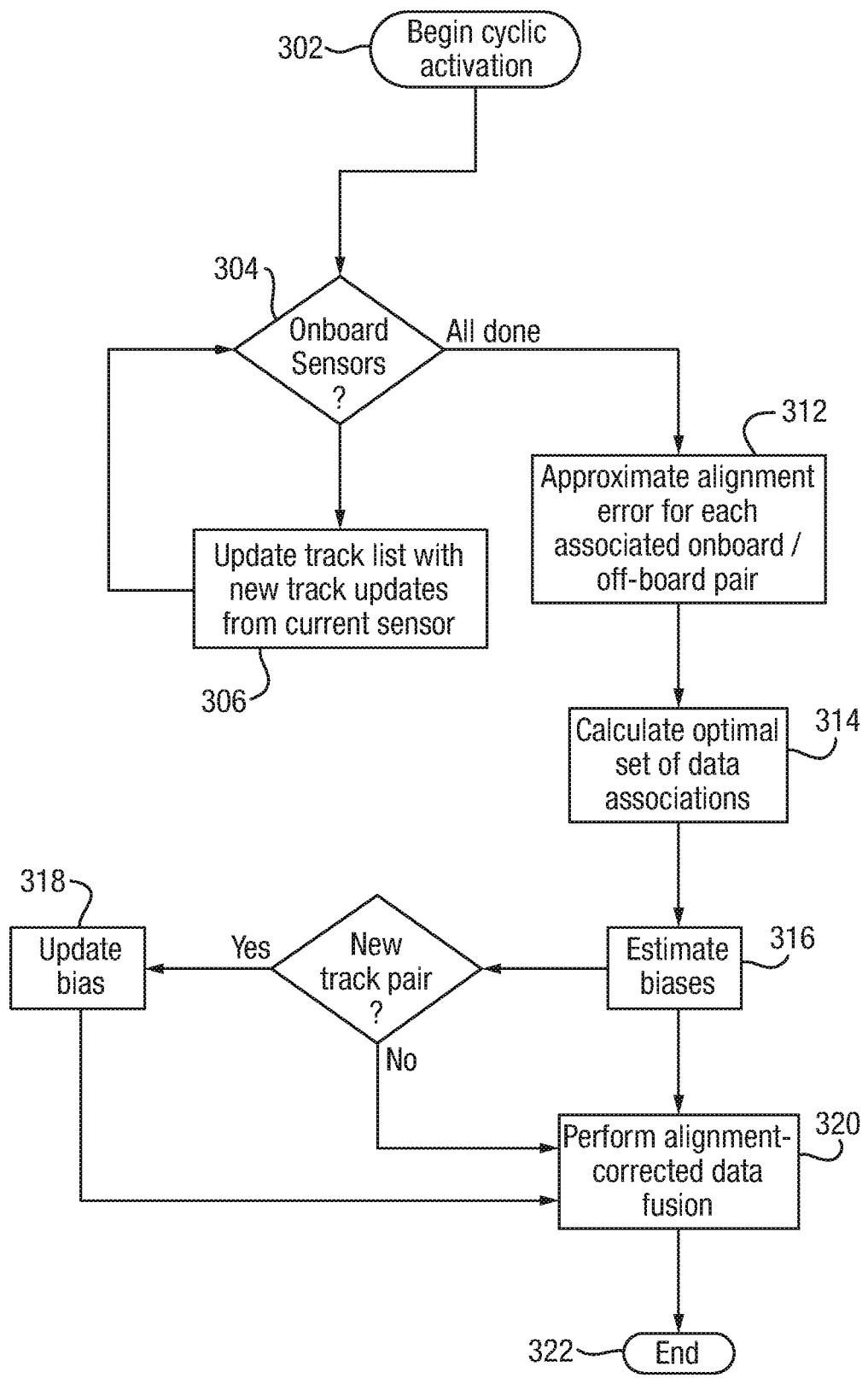
FIG. 3 is a flow chart showing at a high-level operation of the example system.

FIG. 3 shows steps performed by the on-board data association and data fusion process 204. At step 302 cyclic operation of the target sensing system begins. At step 304 a check is performed as to whether track data from all of the on-board sensors has been received and processed. If not, then track update data from the first/next sensor is processed and the track list updated at step 306.

Once this step has been performed for all on-board sensors (that have generated updates), control is passed to step 312.

On-board and off-board track data is configured as associated on-board/off-board track pairs. Thus, at step 312, target alignment error is approximated as an independent Cartesian bias in location for each associated on-board/off-board track pair.

Next, at step 314, the optimal set of data associations is calculated using explicitly modelled target alignment errors in the construction of an assignment matrix, and Munkres algorithm is used to find the optimal set of assignments.

At step 316, a moving average algorithm is used to estimate the biases and, each time an off-board track is assigned to a fused track, the bias estimate is updated at step 318.

Finally, at step 320, the target alignment-corrected data fusion is performed, which results in an updated overall fused track list being output. The output list can be used directly by a processor, e.g. to control a vehicle, displayed to a user and/or used in some other way. The fused data generated may include the following:

List update time
Number of tracks
Tracks

Where each track can include, for example: Local track number; Global track number; Group track number; Track update time; Track update class (e.g. no update, delete, 3_D track, line of sight, IFF response); Multiple target (Boolean); Manoeuvre parameter (magnitude of manoeuvre); Location; Velocity; Environment (unknown, space, air, land, sea, subsurface); and/or Covariance (full location and velocity covariance matrix).

The cyclic operation can end at step 322.

Thus, the present invention provides a data fusion method and system with enhanced data association and target alignment error removal, and an exemplary algorithm for correcting track bias will now be described in more detail, using the following notation:

| Symbol | Meaning |
| --- | --- |
| $\delta N, \delta E, \delta D$ | The alignment bias error in the track North, East and Down coordinates respectively. |
| $\sigma_N^2, \sigma_E^2, \sigma_D^2$ | The variance of the bias error in the track North, East and Down coordinates respectively. |
| $\sigma_{\dot{N}}^2, \sigma_{\dot{E}}^2, \sigma_{\dot{D}}^2$ | The variance of the bias error in the track North, East and Down velocity components respectively. |
| $\sigma_{NG}^2, \sigma_{EG}^2, \sigma_{DG}^2$ | The variance of the error in the track North, East and Down coordinates due to GPS differences. |
| $r, \theta, \psi$ | The polar track Range, Bearing and Elevation coordinates respectively. |
| $\sigma_{\theta S}^2, \sigma_{\psi S}^2$ | The variance of the error in the polar track Bearing and Elevation coordinates respectively due to sensor misalignments. |
| $\sigma_{\theta I}^2$ | The variance of the error in the polar track Bearing coordinate due to INS heading errors. |

Exponential Fading Memory Average—"Infinite" Window

Given the bias sample b for a particular on-board, off-board track pair at time index k $$b(k) = [\delta N(k) \quad \delta E(k) \quad \delta D(k)]$$

$$B \approx \begin{bmatrix} \sigma_N^2 & & & & & \\ & \sigma_{\dot{N}}^2 & & & 0 & \\ & & \sigma_E^2 & & & \\ & & & \sigma_{\dot{E}}^2 & & \\ & 0 & & & \sigma_D^2 & \\ & & & & & \sigma_{\dot{D}}^2 \end{bmatrix}$$

The location error variances due to the Alignment bias . . .

$$\sigma_N^2 \approx r^2(\sigma_{\theta S}^2 + \sigma_{\theta I}^2)\sin^2\theta\cos^2\psi + r^2\sigma_{\psi S}^2\cos^2\theta\sin^2\psi + \sigma_{NG}^2$$

$$\sigma_E^2 \approx r^2(\sigma_{\theta S}^2 + \sigma_{\theta I}^2)\cos^2\theta\cos^2\psi + r^2\sigma_{\psi S}^2\sin^2\theta\sin^2\psi + \sigma_{EG}^2$$

$$\sigma_D^2 \approx r^2\sigma_{\psi S}^2\cos^2\psi + \sigma_{DG}^2$$

The velocity errors due to sensor and Nav misalignment are very small. The steps in GPS location will create disruption to velocity estimates and allowance will be made for these.

$$\sigma_{\dot{N}}^2 \approx \frac{2}{\delta t^2}\sigma_{N_G}^2$$

$$\sigma_{\dot{E}}^2 \approx \frac{2}{\delta t^2}\sigma_{E_G}^2$$

$$\sigma_{\dot{D}}^2 \approx \frac{2}{\delta t^2}\sigma_{D_G}^2$$

The Moving Average is defined by the recursion:

$$c_{ab}(k) = \alpha c_{ab}(k-1) + (1-\alpha)b(k)$$

$$C_{ab}(k) \approx \frac{1-\alpha}{1+\alpha}B \quad \text{(For large values of } k.)$$

The parameter is defined $0 < \alpha < 1$.

The covariance matrix of the established estimator $C_{ab}$ reflects the level of uncertainty regarding the true bias and, given multiple on-board and off-board track updates, is greatly reduced when compared with B, the variance of the bias in a single sample.

The Data Association Algorithm

When platform b sends a track report to platform a, allowance must be made for the contribution to target alignment error in both platforms. So, in an initial track to track association process prior to any target alignment error correction, the Mahalanobis distance between the tracks is calculated:

$$d_{ab}^2 = b(k)^T U^{-1} b(k)$$

$$U = P_a + P_b + B$$

The matrix of association distances is then calculated $[D_{ab}^2]_{\forall a,b}$ where:

$$D_{ab}^2 = \begin{cases} D_{max}^2 & \text{for } d_{ab}^2 > G \\ d_{ab}^2 + \ln|U| + m\ln 2\pi - 2\ln p_0 & \text{otherwise} \end{cases}$$

G is a gate threshold from the $\chi_m^2$ distribution and the test rejects highly unlikely track pairs.

The Munkres algorithm then searches the possible solutions optimally to find the least cost sum set of associations from an allocation matrix $[D_{ab}^2]_{\forall a,b}$.

The inventors have discovered that the use of the alignment bias covariance terms in the calculation of the residual error covariance matrix ($U=P_a+P_b+B$) ensures that the true associations are unlikely to be rejected as infeasible and the use of $D_{max}^2$ in the formation of the allocation matrix has the effect of forcing the selection of the set of associations with maximum number of feasible source/fused track pairs. The inventors have further discovered that in the absence of highly structured clutter and provided the probability of detection and tracking of the targets in question is high on at least one of the platforms, these features of the algorithm maximise the likelihood that the true set of associations is chosen.

Alignment-Corrected Data Fusion

In a fusion process where correction of the target alignment bias is attempted:

$$P^{-1} = P_a^{-1} + (P_b C_{ab})^{-1}$$

$$P^{-1}x = P_a^{-1}x_a + (P_b + C_{ab})^{-1}(x_b - c_{ab}).$$

Again, the fused estimate is x and P is its covariance matrix; and $c_{ab}$ is an estimate of the correction required to translate $x_b$ to the axis set of platform a, and $C_{ab}$ is its covariance matrix. This estimate should be free from bias because the error in $c_{ab}$ should be zero-mean noise. It will be appreciated this example uses a very simple fusion algorithm with independent errors $x_a$ and $x_b$, but the invention can be extended to more sophisticated data fusion algorithms.

Thus, the present invention addresses the estimation and reduction of target alignment errors experienced by aircraft receiving target information from off-board sensors and fusing that information with on-board sensor data. The algorithms produced by the system minimise errors and maximise the likelihood that an off-board designated target is matched correctly with on-board sensor detections. Each member of a Network Enabled Capability (NEC) group corrects the target alignment of data from other sources with respect to its own particular target alignment, with the aim that its own situation awareness is maximised and, consequently, the quality of the data it provides to other co-operators is also maximised.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A method of producing on a vehicle data describing target measurements of one or more target positions using a processor in a system having at least one sensor on-board the vehicle, the method including:
   obtaining first on-board sensor data representative of a target from said on-board sensor;
   obtaining from an off-board sensor of an off-board vehicle co-operator first off-board sensor data representative of said target;
   associating track data obtained by said on-board sensor with corresponding track data from said off-board sensor to create a first on-board/off-board track pair;
   approximating a target alignment error in relative alignment of a frame-of-reference of the on-board sensor and a frame-of-reference of the off-board sensor between said first on-board sensor data representative of said target and said first off-board sensor data representative of said target for said first on-board/off-board track pair;
   subsequently obtaining second on-board sensor data representative of said target from said on-board sensor and obtaining second off-board sensor data representative of said target from said off-board sensor;
   receiving alignment error data derived from said second on-board and off-board sensor data;
   estimating a bias using said received alignment error data and correcting said approximated target alignment error using said bias; and
   performing a data fusion process on the obtained first off-board sensor data and the obtained first on-board sensor data using said corrected approximated target alignment error to produce target measurement data of said target.

2. A method according to claim 1, including creating a plurality of on-board/off-board track pairs in relation to a plurality of respective pairs of on-board and off-board sensors within an environment in which said system is operating, and approximating a target alignment error in respect of each of said on-board/off-board track pairs.

3. A method according to claim 1, wherein said target alignment error is approximated as an independent Cartesian bias in location between said frames-of-reference of said on-board and off-board track data.

4. A method according to claim 2, including constructing an assignment matrix comprising on-board/off-board track data associations, said assignment matrix being constructed using modelled target alignment errors in respect of said on-board/off-board track pairs.

5. A method according to claim 4, including selecting an optimal set of data associations from said assignment matrix.

6. A method according to claim 5, wherein said optimal set of data associations is selected using a Munkres algorithm.

7. A method according to claim 2, including updating said estimated bias each time new off-board track data is associated with fused on-board track data.

8. A method according to claim 7, wherein said bias is estimated using a moving average algorithm.

9. A method according to claim 1, wherein the target measurement data includes descriptions of location and/or velocity of the target.

10. A non-transitory computer-readable medium containing instructions executable by a computing device so as to carry out the method of claim 1.

11. A system having a processor and at least one sensor on-board a vehicle, the system being configured to produce data describing measurements of one or more targets and including:

a device configured to obtain first on-board sensor data from an on-board sensor;

a device configured to obtain first off-board sensor data from an off-board sensor of an off-board vehicle co-operator;

a device configured to associate track data obtained by said on-board sensor with corresponding track data from said off-board sensor to create a first on-board/off-board track pair;

a device configured to approximate a target alignment error in relative alignment of a frame-of-reference of the on-board sensor and a frame-of-reference of the off-board sensor between said first on-board and off-board sensor data for said first on-board/off-board track pair;

a device configured to subsequently obtain second on-board sensor data representative of said target from said on-board sensor;

a device configured to obtain second off-board sensor data representative of said target from said off-board sensor;

a device configured to receive target alignment error data derived from said second on-board and off-board sensor data;

a device configured to estimate a bias using said received target alignment error data and to correct said target alignment error using said bias; and a device configured to perform a data fusion process on the obtained first off-board sensor data and the obtained first on-board sensor data using said approximated target alignment error to produce target measurement data.

12. A system according to claim 11, wherein the system comprises an at least partially autonomous vehicle.

13. A system according to claim 11, wherein the systems is carried by an aircraft.

* * * * *